United States Patent
Goto

(10) Patent No.: US 8,561,092 B2
(45) Date of Patent: Oct. 15, 2013

(54) DISC LOADING MECHANISM AND DISC DRIVE APPARATUS

(75) Inventor: Naofumi Goto, Tokyo (JP)

(73) Assignee: Sony Corporation, Tokyo (JP)

( * ) Notice: Subject to any disclaimer, the term of this patent is extended or adjusted under 35 U.S.C. 154(b) by 306 days.

(21) Appl. No.: 12/708,093

(22) Filed: Feb. 18, 2010

(65) Prior Publication Data
US 2010/0251272 A1  Sep. 30, 2010

(30) Foreign Application Priority Data

Mar. 25, 2009  (JP) .................................. 2009-074325

(51) Int. Cl.
G11B 17/03 (2006.01)
G11B 17/028 (2006.01)

(52) U.S. Cl.
USPC .......................................................... 720/713

(58) Field of Classification Search
USPC ................. 720/604, 605, 706, 721–724, 707, 720/711–714; 369/258.1, 264, 270.1, 369/271.1, 30.93–30.98
See application file for complete search history.

(56) References Cited

U.S. PATENT DOCUMENTS

| | | | | |
|---|---|---|---|---|
| 778,543 A * | 12/1904 | Le Mon et al. | ............... | 369/269 |
| 2,302,503 A * | 11/1942 | Proctor | ...................... | 369/271.1 |
| 2,658,761 A * | 11/1953 | Morris | ........................... | 369/199 |
| 4,539,614 A * | 9/1985 | Thompson | ................. | 360/99.02 |
| 4,829,510 A * | 5/1989 | Takahashi | ..................... | 720/721 |
| 5,668,792 A * | 9/1997 | Choi | .............................. | 720/627 |
| 5,933,408 A * | 8/1999 | Park et al. | ..................... | 720/706 |
| 6,141,185 A * | 10/2000 | Blum | ............................. | 360/133 |
| 6,845,511 B2 * | 1/2005 | Kuo et al. | ..................... | 720/706 |
| 2002/0009036 A1 * | 1/2002 | Omori | ......................... | 369/75.2 |
| 2004/0081072 A1 * | 4/2004 | Boissonneault et al. | ...... | 369/289 |
| 2005/0223401 A1 * | 10/2005 | Fukasawa | .................... | 720/706 |
| 2006/0209662 A1 * | 9/2006 | Chen | ............................. | 369/176 |
| 2007/0050785 A1 * | 3/2007 | Osaki | ............................ | 720/604 |
| 2009/0228907 A1 * | 9/2009 | Suzuki | .......................... | 720/604 |

FOREIGN PATENT DOCUMENTS

| | | |
|---|---|---|
| JP | 62-147164 U | 9/1987 |
| JP | 2000-268459 | 9/2000 |
| JP | 2004-185774 A | 7/2004 |
| JP | 2004-199838 A | 7/2004 |
| JP | 2008-4209 A | 1/2008 |

OTHER PUBLICATIONS

Office Action issued Dec. 4, 2012 in Japanese Patent Application No. 2009-074325 (with English-language translation).

* cited by examiner

*Primary Examiner* — Wayne Young
*Assistant Examiner* — Adam B Dravininkas
(74) *Attorney, Agent, or Firm* — Oblon, Spivak, McClelland, Maier & Neustadt, L.L.P.

(57) ABSTRACT

A disc loading mechanism includes a turntable on which a disc is mounted and a chucking pulley that sandwiches the disc together with the turntable. The chucking pulley includes a pulley engaging member on which a plurality of engaging protrusions are formed. The turntable includes a table engaging member on which a plurality of engaging pieces are formed, the plurality of engaging pieces each having an engaging surface that hangs over a chucking pulley-facing surface of one of the plurality of engaging protrusions in a rotation direction of the disc.

23 Claims, 8 Drawing Sheets

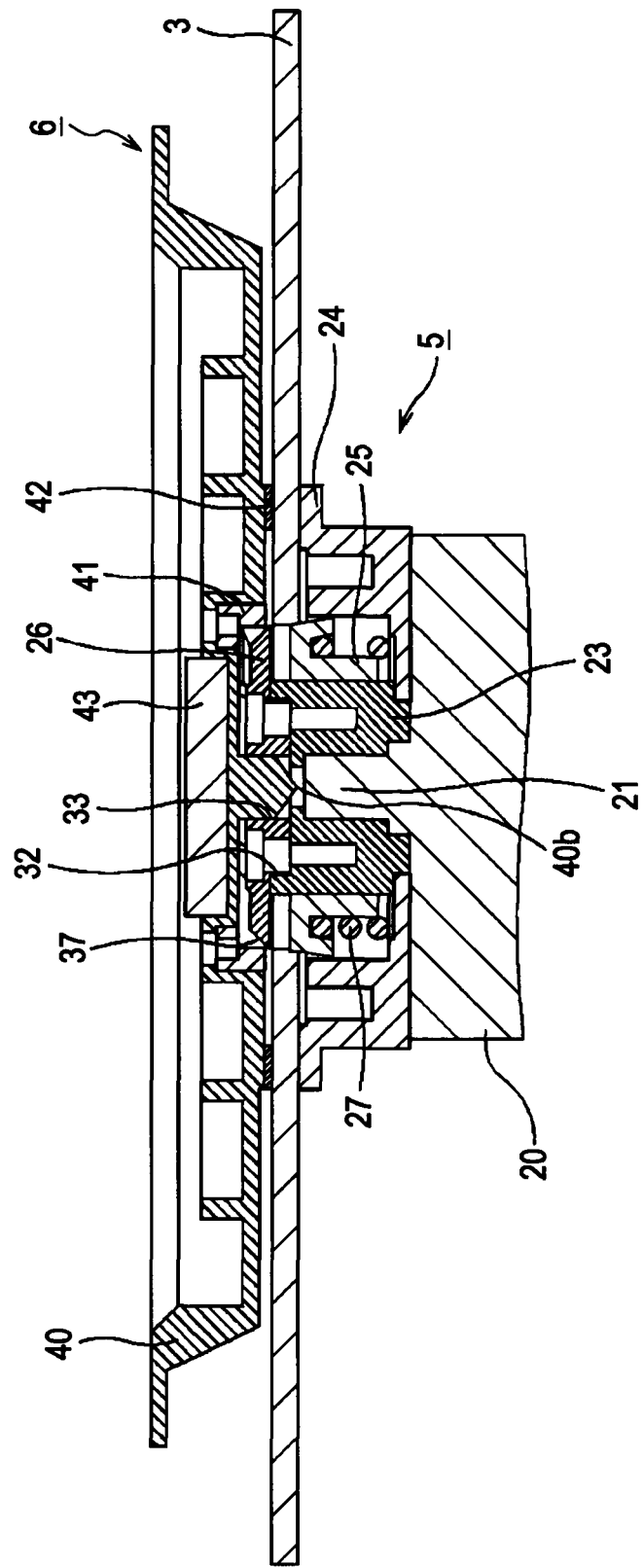

DISC LOADING MECHANISM AND DISC DRIVE APPARATUS

BACKGROUND OF THE INVENTION

1. Field of the Invention

The present invention relates to a disc loading mechanism that rotatably holds a disc, and a disc drive apparatus that includes the disc loading mechanism.

2. Description of the Related Art

Various optical discs of different storage capacities such as a CD, a DVD, and a BD are available. A disc drive apparatus that performs recording and/or playback on such various optical discs is intended to rotate a loaded optical disc at an optimum rotation speed for the optical disc. In detail, in the case of performing recording or playback on an optical disc of a relatively small storage capacity such as a CD, it is sufficient for the disc drive apparatus to drive a spindle motor by low-speed rotation. In the case of performing double-speed recording or the like on an optical disc of a large storage capacity such as a BD, on the other hand, the disc drive apparatus drives the spindle motor by high-speed rotation. To support a wide variety of optical discs of different storage capacities, the disc drive apparatus desirably rotates an optical disc in a range of about 1000 rpm to about 15000 rpm. Further, rotation up to about 20000 rpm is expected in the future.

When rotating an optical disc at high speed, friction between the optical disc and the air in the apparatus body increases, as a result of which a torque in a direction opposite to a disc rotation direction due to air resistance, namely, a windage-loss torque, increases. Since a larger windage-loss torque occurs in an outer periphery of the optical disc, the optical disc may slip on a turntable that rotatably supports the optical disc. This makes it difficult to rotate the optical disc at a predetermined rotation speed, and also causes adverse effects on recording/playback characteristics.

Moreover, the optical disc is typically held on the turntable by magnetic attraction between the turntable and a chucking pulley. In many cases, an upper part of the optical disc is closed by an outer wall of an enclosure, whereas a lower part of the optical disc is open as an optical pickup driving region. Therefore, during high-speed rotation, an increase in pressure difference between the upper and lower surfaces of the optical disc may cause the optical disc to vibrate considerably, thereby inhibiting stable rotation. In addition to the vibration of the optical disc, because the upper part of the optical disc is relatively at a negative pressure, there is a possibility that the optical disc is drawn upward and as a result the chucking pulley becomes disengaged. Besides, when a force of attraction between the turntable and the chucking pulley is weak, the vibration of the optical disc during high-speed rotation further increases, making the chucking pulley more easily disengaged. Furthermore, the vibration of the optical disc causes vibration noise.

On the other hand, if the magnetic attraction force between the turntable and the chucking pulley is increased, upon ejection of the optical disc an excessive load is put on a driving mechanism in order to pull the turntable and the chucking pulley apart. Thus, there is a limit to the increase of the magnetic force.

Japanese Unexamined Patent Application Publication No. 2000-268459 is an example of related art.

SUMMARY OF THE INVENTION

It is desirable to provide a disc loading mechanism that can perform dechucking easily without increasing a magnetic attraction force between a turntable and a chucking pulley and also reliably chuck an optical disc by increasing an attachment/detachment force only during high-speed rotation of the disc to thereby rotate the disc stably and quietly, and a disc drive apparatus using the disc loading mechanism.

According to an embodiment of the present invention, there is provided a disc loading mechanism including a turntable on which a disc is mounted and a chucking pulley that sandwiches the disc together with the turntable. The chucking pulley includes a pulley engaging member on which a plurality of engaging protrusions are formed, and the turntable includes a table engaging member on which a plurality of engaging pieces are formed, the plurality of engaging pieces each having an engaging surface that hangs over a chucking pulley-facing surface of one of the plurality of engaging protrusions in a rotation direction of the disc.

According to another embodiment of the present invention, there is also provided a disc drive apparatus including a turntable on which a disc is mounted, a disc rotation mechanism that rotates the turntable, an optical pickup mechanism that performs at least one of recording and playback of an information signal on the disc rotated by the disc rotation mechanism, a conveyance mechanism that conveys the disc, and a chucking pulley that rotatably sandwiches the disc together with the turntable. The chucking pulley includes a pulley engaging member on which a plurality of engaging protrusions are formed, and the turntable includes a table engaging member on which a plurality of engaging pieces are formed, the plurality of engaging pieces each having an engaging surface that hangs over a chucking pulley-facing surface of one of the plurality of engaging protrusions in a rotation direction of the disc.

According to the embodiments of the present invention, when the turntable is rotated, the engaging surfaces of the engaging pieces hang over the engaging protrusions, so that a torque produced with the rotation can be made to act upon the chucking pulley as a chucking force of attaching by pressure to the turntable via the engaging protrusions. This torque associated with the rotation is increased as the rotation speed increases. Therefore, even when the disc is rotated at high speed, the engaging pieces reliably sandwich the disc by using the chucking force that increases according to the torque produced by the high-speed rotation. Hence, the vibration of the optical disc and the disengagement of the chucking pulley can be prevented.

BRIEF DESCRIPTION OF THE DRAWINGS

FIG. 4 is a sectional view showing the turntable and the chucking pulley for chucking an optical disc.

DESCRIPTION OF THE PREFERRED EMBODIMENTS

A disc drive apparatus according to an embodiment of the present invention is described in detail below, with reference to drawings. The description is given in the following order.
1. Disc drive apparatus
2. Turntable
3. Chucking pulley
4. Disc chucking operation
<1. Disc Drive Apparatus>

Figure 1:
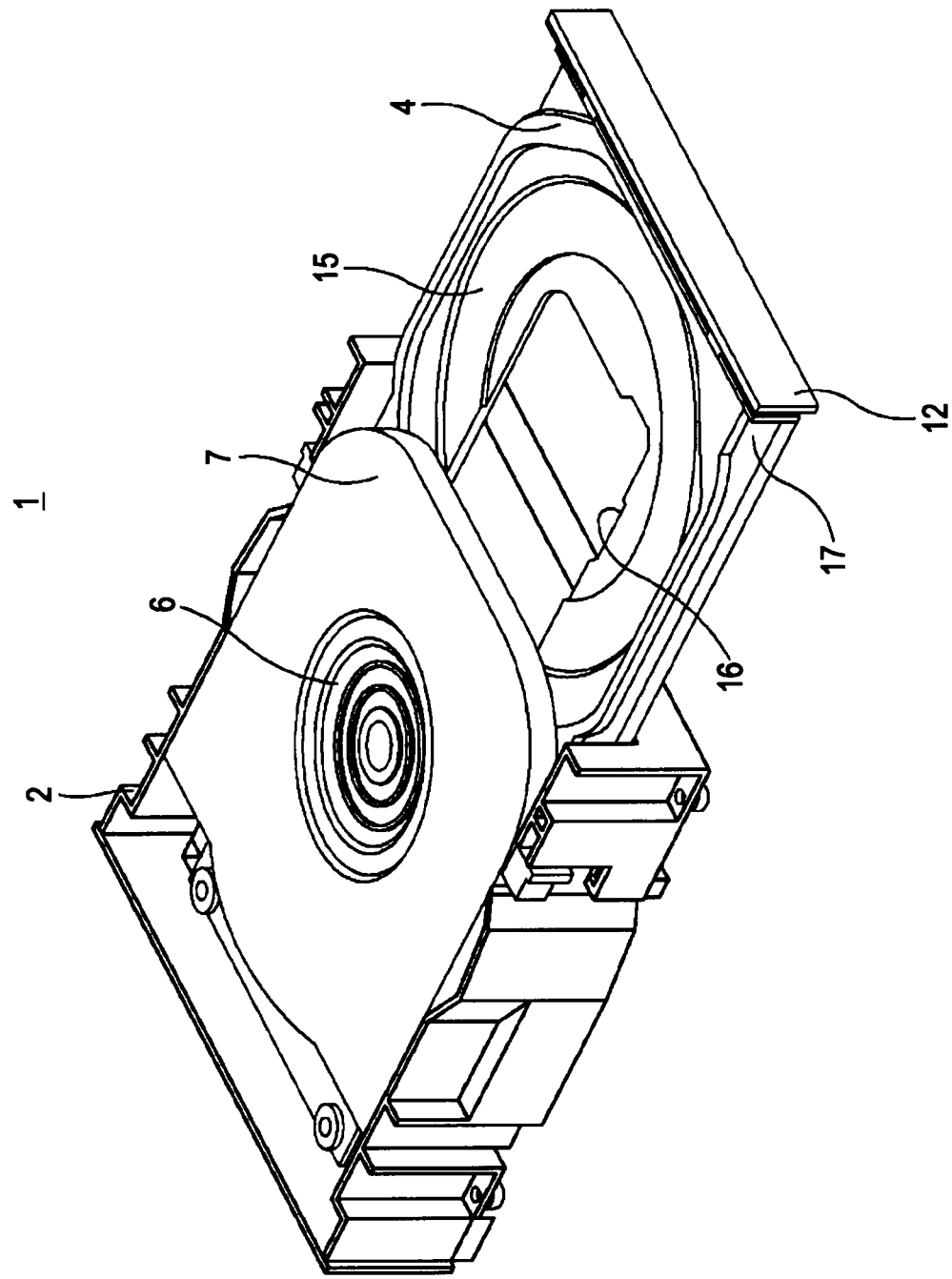
FIG. 1 is an external perspective view showing a disc drive apparatus according to an embodiment of the present invention.
Figure 2:
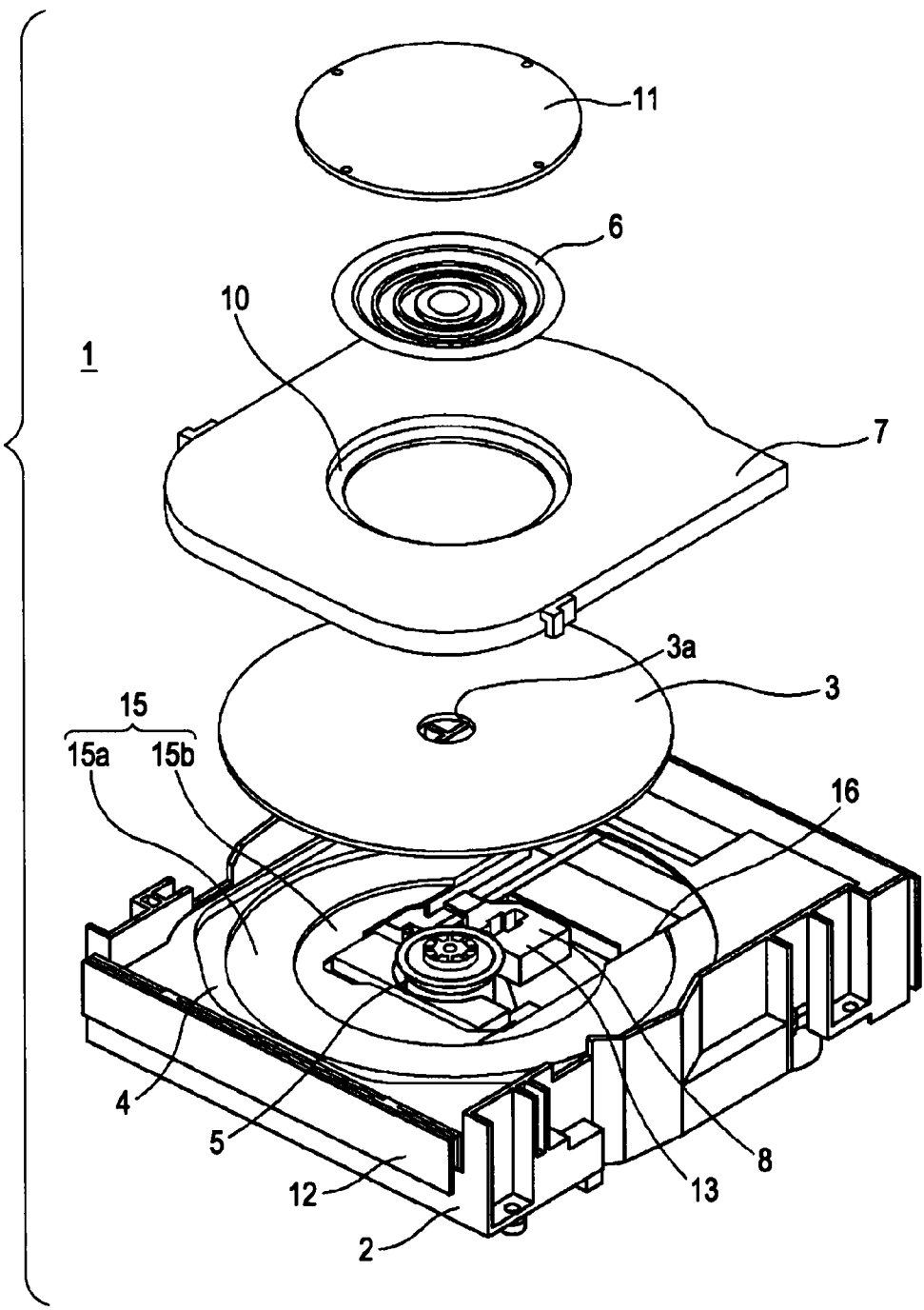
FIG. 2 is an exploded perspective view showing the disc drive apparatus according to the embodiment of the present invention.

A disc drive apparatus 1 according to an embodiment of the present invention is a so-called tray-type disc drive apparatus including a substantially rectangular apparatus body 2, with a disc tray 4 on which an optical disc 3 is mounted being conveyed inside and outside the apparatus body 2, as shown in FIGS. 1 and 2. The disc drive apparatus 1 is installed in an enclosure of a host machine such as a personal computer, a game machine, and a stationary disc recording/playback apparatus connected to a monitor of a liquid crystal display television or the like, and is operated by the host machine.

The disc drive apparatus 1 includes, in the apparatus body 2, the disc tray 4 on which the optical disc 3 is mounted, a turntable 5 that rotatably supports the optical disc 3 conveyed into the apparatus body 2, a chucking pulley 6 that sandwiches the optical disc 3 together with the turntable 5, a top cover 7 that supports the chucking pulley 6, and an optical pickup mechanism 8 that writes and/or reads an information signal on the optical disc 3.

[Apparatus Body]

The apparatus body 2 includes a gear mechanism of slidably supporting the disc tray 4 in a front-back direction and conveying the disc tray 4 inside and outside the apparatus body 2. The apparatus body 2 also includes a lift mechanism of moving the turntable 5 and the top cover 7 toward or away from the optical disc 3. The apparatus body 2 further includes driving motors as driving sources of the gear mechanism and the lift mechanism, and a circuit board where control circuits for controlling the driving motors and the like are formed.

Moreover, the apparatus body 2 is connected to the host machine via a connector included in the circuit board. The conveyance of the disc tray 4, the rotation of the turntable 5, and the driving of the optical pickup mechanism 8 are controlled by a control unit in the host machine.

[Disc Tray]

The disc tray 4 which is slidably supported by the apparatus body 2 includes a disc receptacle 15 composed of a circular recessed portion capable of receiving the optical disc 3 such as a CD, a DVD, and a BD transversely, and an opening 16 shaped like an elongated hole extending backward from a center of the disc receptacle 15 along a tray center. The disc receptacle 15 has a large diameter portion 15a used for mounting the optical disc 3 of 12 cm in diameter, and a small diameter portion 15b composed of a recessed portion formed at a center of the large diameter portion 15a and used for mounting the optical disc 3 of 8 cm in diameter.

The opening 16 of the disc tray 4 is formed from a center of the small diameter portion 15b of the disc receptacle 15 toward the back, and extended to outside the disc receptacle 15 by cutting a part of the large diameter portion 15a. A size and a shape of the opening 16 are such that an upper part of the optical pickup mechanism 8 and the turntable 5 provided in the apparatus body 2 can be completely contained in the opening 16. When the disc tray 4 is inserted into the apparatus body 2, the turntable 5 and the optical pickup mechanism 8 are moved upward into the opening 16 by the lift mechanism. As a result, an engaging yoke 26 of the turntable 5 as a table engaging member is inserted through a center hole 3a of the optical disc 3. Moreover, a pickup base 13 of the optical pickup mechanism 8 on which an objective lens is provided is set facing a signal recording surface of the optical disc 3.

The disc tray 4 also includes one pair of left and right guide rails 17 extending in parallel in the front-back direction, on both left and right edges. Each guide rail 17 is supported on a side wall of the apparatus body 2, thereby making the disc tray 4 slidable in the front-back direction of the apparatus body 2. By the guide rails 17 being supported by a chassis and engaged with the gear mechanism (not shown), the disc tray 4 is conveyed between a disc insertion/removal position where the disc tray 4 is ejected outside the apparatus body 2 to insert or remove the optical disc 3 as shown in FIG. 1 and a chucking position where the disc tray 4 is moved inside the apparatus body 2 to rotatably chuck the optical disc 3 as shown in FIG. 2.

Moreover, a lid 12 is attached to a front surface of the disc tray 4. When the apparatus body 2 is incorporated in the enclosure of the host machine, the lid 12 constitutes a part of an external surface of the enclosure. Accordingly, when the disc tray 4 is conveyed to the chucking position, the disc tray 4 closes the enclosure of the host machine by the lid 12.

[Optical Pickup Mechanism]

The optical pickup mechanism 8 that records or plays an information signal on the optical disc 3 includes the pickup base 13 composed of a substantially rectangular case. At least a light source (not shown) such as a semiconductor laser, the objective lens for converging and applying a light beam generated from the light source onto the signal recording surface of the optical disc 3, a photodetector (not shown) for detecting return light reflected from the recording surface of the optical disc 3, and a driving system for driving the objective lens in a focusing direction and a tracking direction of the optical disc 3 are disposed in the pickup base 13.

One pair of guide shafts for guiding the movement of the pickup base 13 are inserted through both longitudinal ends of the pickup base 13. Moreover, the pickup base 13 is connected to a lead screw provided adjacent to and in parallel with the guide shafts in a radial direction of the optical disc 3, via a rack.

The guide shafts are disposed in parallel in the radial direction of the optical disc 3 conveyed to the chucking position, and guide the movement of the pickup base 13 by being inserted through both ends of the pickup base 13.

The lead screw is disposed in parallel with the guide shafts, and engaged with one side edge of the pickup base 13. A feed motor for rotating the lead screw is attached to one end of the lead screw, and the lead screw is rotatably supported by a bearing at the other end. A thread groove is formed in a shaft of the lead screw, and the rack attached to the pickup base 13 is engaged with the thread groove. The lead screw is rotated by the feed motor, thereby allowing the pickup base 13 to move in the radial direction of the optical disc 3.

<2. Turntable>

Figure 3:
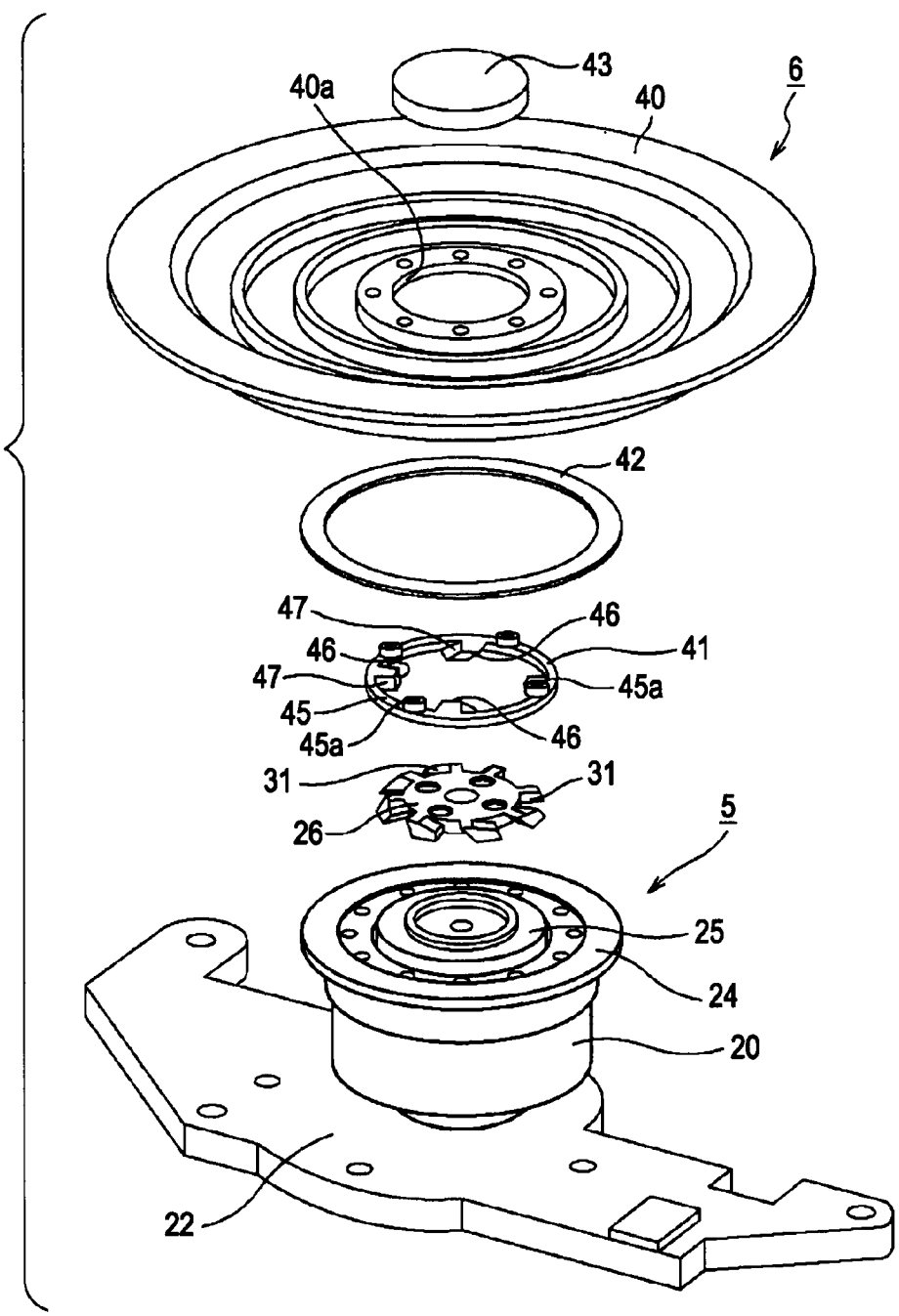
FIG. 3 is an exploded perspective view showing a turntable and a chucking pulley.

The following describes the turntable 5 on which the optical disc 3 conveyed to the chucking position is mounted. As shown in FIGS. 3 and 4, the turntable 5 is connected to a spindle shaft 21 of a spindle motor 20. A support plate 22 carrying the spindle motor 20 is moved up and down by the lift mechanism, as a result of which the turntable 5 is inserted through the opening 16 of the disc tray 4 to support the optical disc 3, and rotated integrally with the spindle shaft 21.

The turntable 5 includes a connection member 23 connected to the spindle shaft 21, a flange 24 on which a periphery of the center hole 3a of the optical disc 3 is mounted, a protrusion 25 fitted to the connection member 23 and inserted through the center hole 3a of the optical disc 3, and the engaging yoke 26 engaged with an engaging ring 41 as a pulley engaging member provided in the chucking pulley 6 described later. In the turntable 5, the protrusion 25 is fitted to an outer peripheral surface of the connection member 23 so as to be slidable in a vertical direction and also biased upward by a coil spring 27. The protrusion 25 is inserted through the center hole 3a of the optical disc 3 to thereby perform centering of the optical disc 3.

After the periphery of the center hole 3a of the optical disc 3 is mounted on the flange 24, the engaging yoke 26 and a magnet 43 of the chucking pulley 6 are magnetically attracted to each other. This enables the turntable 5 to sandwich the optical disc 3 together with the chucking pulley 6. When the spindle motor 20 is driven, the turntable 5 is rotated integrally with the spindle shaft 21, thereby rotating the optical disc 3 at a predetermined rotation speed. Here, by the engagement between the engaging yoke 26 and the engaging ring 41, the turntable 5 reliably sandwiches the optical disc 3 using a torque associated with the high-speed rotation of the optical disc 3. Thus, the vibration of the optical disc 3 and the disengagement of the chucking pulley 6 can be prevented.

Figure 5A:
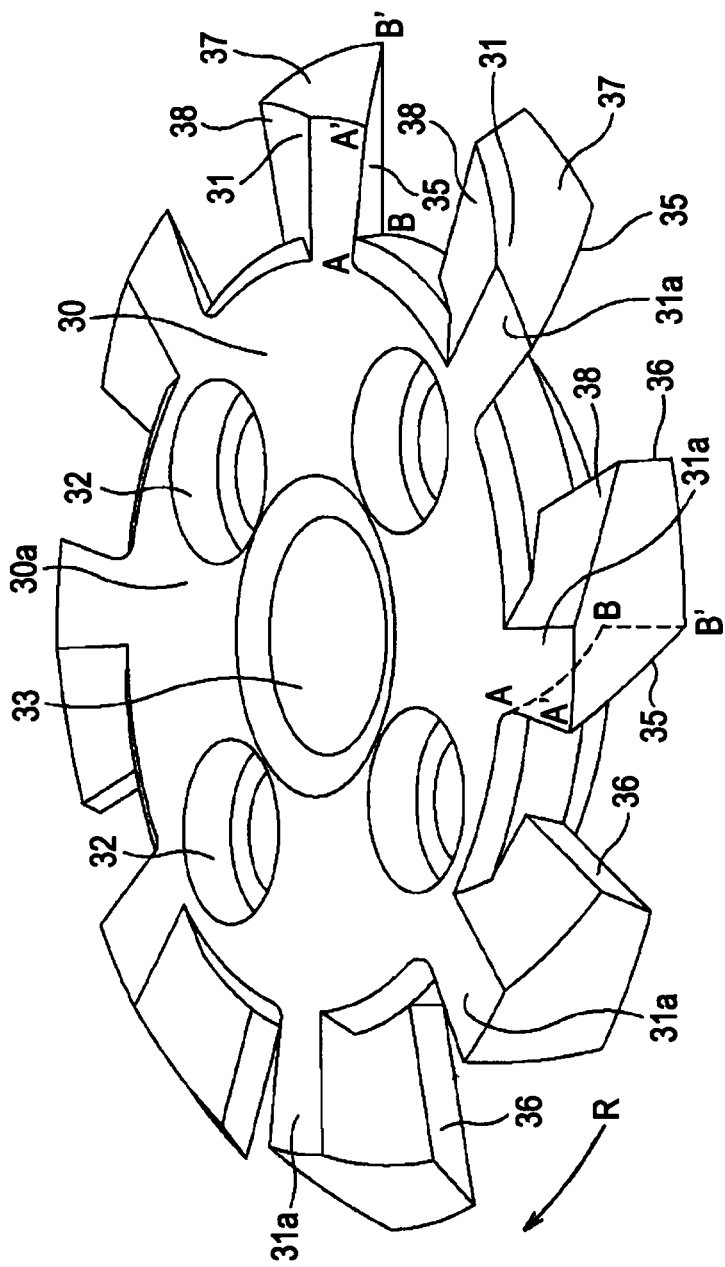
FIG. 5A is an external perspective view showing an engaging yoke.

As shown in FIG. 5A, the engaging yoke 26 is a circular plate member formed using a magnetic material such as iron that can be magnetically attracted to the magnet 43 of the chucking pulley 6, and includes a circular plate yoke body 30 and a plurality of engaging pieces 31 protruding from an outer peripheral surface of the yoke body 30. A plurality of attachment holes 32 for attachment to the protrusion 25 are formed on a main surface 30a of the yoke body 30. In addition, an insertion hole 33 through which a protrusion 40b of the chucking pulley 6 is inserted is formed at a center of the main surface 30a of the yoke body 30.

The engaging pieces 31 are engaged with engaging protrusions 46 of the engaging ring 41 provided in the chucking pulley 6 described later, thereby preventing the chucking pulley 6 from separating from the turntable 5. Each engaging piece 31 has an engaging surface 35 that hangs over in a direction of an arrow R in FIG. 5A which is a rotation direction of the optical disc 3, and a locking surface 36 that is formed on an end surface in an opposite direction of the arrow R and locked by the corresponding engaging protrusion 46. The plurality of engaging pieces 31 are provided on the outer peripheral surface of the yoke body 30. The plurality of engaging pieces 31 may be provided on the outer peripheral surface of the yoke body 30 so as to face each other. For example, eight engaging pieces 31 are formed on the outer peripheral surface of the yoke body 30 at an equal interval, as shown in FIG. 5A.

Figure 6:
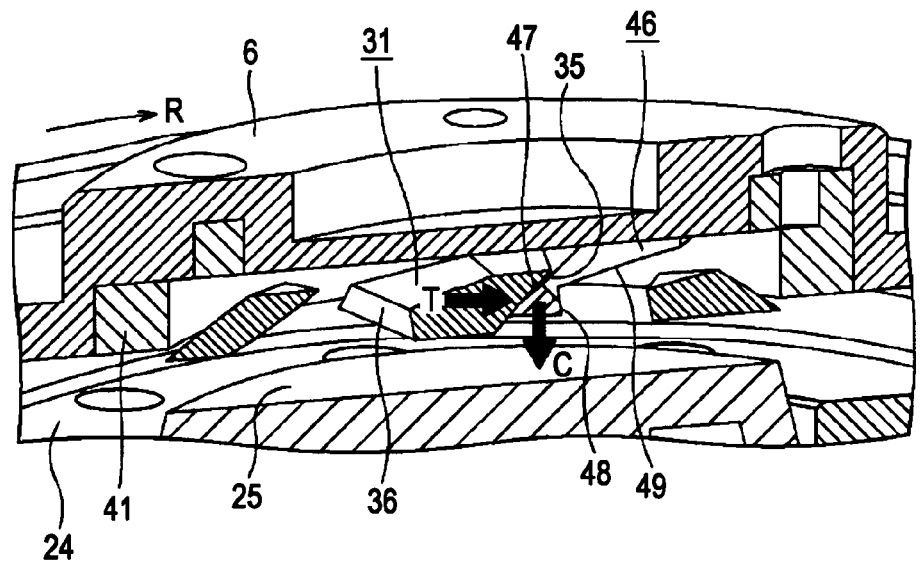
FIG. 6 is a sectional view showing a state where an engaging piece and an engaging protrusion are engaged with each other.

The engaging surface 35 hangs over in the direction of the arrow R in FIG. 5A which is the rotation direction of the optical disc 3, so as to form a tapered surface that is inclined relative to a contact/separation direction of the chucking pulley 6. When the chucking pulley 6 becomes close to the turntable 5, the engaging protrusion 46 of the engaging ring 41 is inserted between the engaging pieces 31. As shown in FIG. 6, when the turntable 5 is rotated in the direction of the arrow R, the engaging surface 35 hangs over an engaged surface 47 of the engaging protrusion 46 facing the chucking pulley 6 and contacts the engaged surface 47. Thus, by the engaging surface 35 contacting the engaged surface 47 of the engaging protrusion 46 facing the chucking pulley 6, the engaging piece 31 prevents the disengagement between the turntable 5 and the chucking pulley 6.

Figure 7:
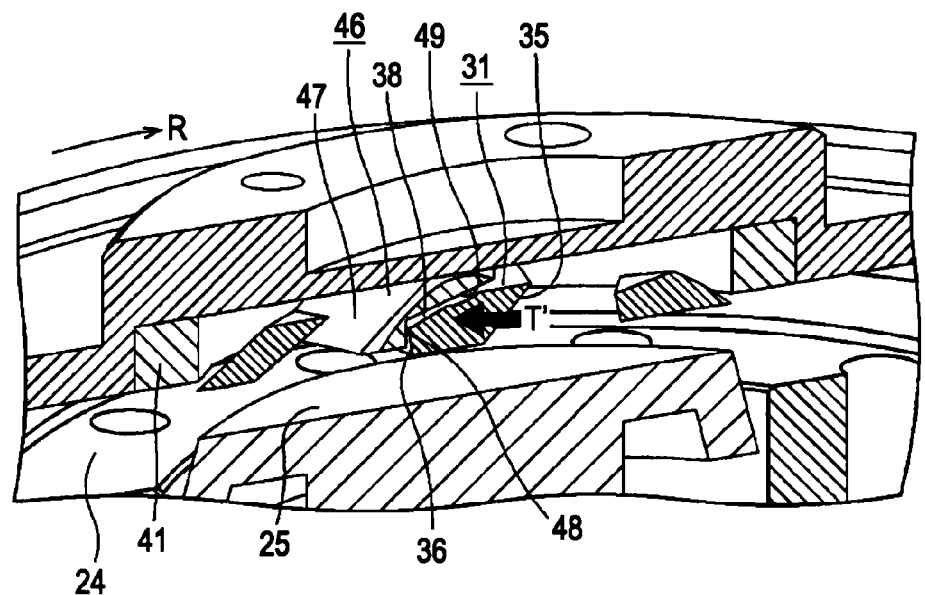
FIG. 7 is a sectional view showing a state where the engaging piece and the engaging protrusion are locked together.

The locking surface 36 is provided on a side opposite to a side where the engaging surface 35 of the engaging piece 31 is provided, and is an inclined surface that is slightly inclined in the direction of the arrow R from an upper surface 38 formed so as to be gradually inclined downward in a thickness direction of the engaging yoke 26 from the top of the engaging surface 35. In the case of reducing the rotation speed of the turntable 5 or stopping the rotation, when a torque in the opposite direction of the arrow R is produced on the engaging yoke 26 as the turntable 5 slows down, the locking surface 36 locks a locked surface 48 formed on the engaging protrusion 46 of the engaging ring 41, as shown in FIG. 7. In this way, even when a torque in the opposite direction of the arrow R is produced on the engaging yoke 26, the engaging piece 31 and the engaging protrusion 46 can prevent the chucking pulley 6 from deviating in a direction of disengagement from the turntable 5.

<3. Chucking Pulley>

The chucking pulley 6 that sandwiches the optical disc 3 together with the turntable 5 includes a circular plate pulley body 40, the engaging ring 41 attached to a surface of the pulley body 40 facing the turntable 5, a friction sheet 42 adhering to an upper surface of the optical disc 3 and producing a friction torque between the optical disc 3 and the chucking pulley 6, and the magnet 43 magnetically attracting the engaging yoke 26, as shown in FIGS. 3 and 4.

A magnet holding hole 40a in which the magnet 43 is disposed is formed on one surface of the pulley body 40, and the positioning protrusion 40b which is inserted through the insertion hole 33 of the engaging yoke 26 when chucking the optical disc 3 is formed on the other surface of the pulley body 40. The pulley body 40 is rotatably supported by being fitted into a support hole 10 formed in the top cover 7 and also being closed by a pulley cover 11. The magnet 43 held in the magnet holding hole 40a is magnetically attracted to the engaging yoke 26 of the turntable 5 and the engaging ring 41 is engaged with the engaging yoke 26, as a result of which the pulley body 40 is integrated with the turntable 5 and rotated integrally with the turntable 5.

The engaging ring 41 includes an annular ring portion 45 and the plurality of engaging protrusions 46 protruding from an inner peripheral surface of the ring portion 45. A plurality of screw holes 45a attached to the pulley body 40 are formed in the ring portion 45.

As shown in FIGS. 6 and 7, the engaging protrusions 46 each have the engaged surface 47 that is engaged with the engaging surface 35 of the engaging piece 31 protruding from the engaging yoke 26 and the engaged surface 48 that locks the locking surface 36 of the engaging piece 31. The plurality of engaging protrusions 46 are provided on the inner peripheral surface of the ring portion 45. The plurality of engaging protrusions 46 may be provided on the inner peripheral surface of the ring portion 45 so as to face each other. For example, a smaller number of engaging protrusions 46 than the engaging pieces 31, e.g., four engaging protrusions 46 which are half in number of the engaging pieces 31, are formed on the inner peripheral surface of the ring portion 45 at an equal interval, as shown in FIG. 3.

The engaged surface 47 faces the pulley body 40, and is formed as a tapered surface so as to gradually increase in thickness in the direction of the arrow R in FIG. 7. As shown in FIG. 6, when the turntable 5 is rotated in the direction of the arrow R, the engaging surface 35 of the engaging piece 31 of the engaging yoke 26 hangs over and contacts the engaged surface 47.

The engaged surface 48 is provided on a side opposite to a side where the engaged surface 47 is provided, and is an inclined surface that is inclined in the direction of the arrow R from an end of a top surface 49 in the opposite direction of the arrow R that covers the upper surface 38 of the engaging piece 31 from the pulley body 40 side. When a torque in the opposite direction of the arrow R is produced on the engaging yoke 26 in the case of slowing down or stopping the turntable 5, the upper surface 38 of the engaging piece 31 enters beneath the top surface 49 and the engaging surface 36 contacts the engaged surface 48. Thus, the engaged surface 48 is locked so as to be covered by the engaging surface 36 from the pulley body 40 side, so that the engaging piece 31 and the engaging protrusion 46 can prevent the chucking pulley 6 from deviating in a direction of disengagement from the turntable 5.

<4. Disc Chucking Operation>

The turntable 5 and the chucking pulley 6 operate as follows. When the optical disc 3 is conveyed to the chucking position by the disc tray 4, the support plate 22 and the top cover 7 are moved up and down, as a result of which the engaging yoke 26 is inserted through the center hole 3a of the optical disc 3 and comes close to the engaging ring 41. At this time, the engaging protrusions 46 of the engaging ring 41 are inserted between the engaging pieces 31 of the engaging yoke 26, enabling the engaged surfaces 47 to contact the engaging surfaces 35. Even in the case where the engaging protrusions 46 are placed above the engaging pieces 31, the engaging protrusions 46 are slid with the rotation of the turntable 5 and inserted between the engaging pieces 31. In this way, the turntable 5 and the chucking pulley 6 sandwich the optical disc 3 by the magnetic attraction force between the magnet 43 and the engaging yoke 26.

When the optical disc 3 is conveyed to the chucking position and chucked by the turntable 5 and the chucking pulley 6, the disc drive apparatus 1 rotates the turntable 5 by driving the spindle motor 20, thereby rotating the optical disc 3 at a CLV (constant linear velocity), a CAV (constant angular velocity), or a combination of the CLV and the CAV.

Figure 8:
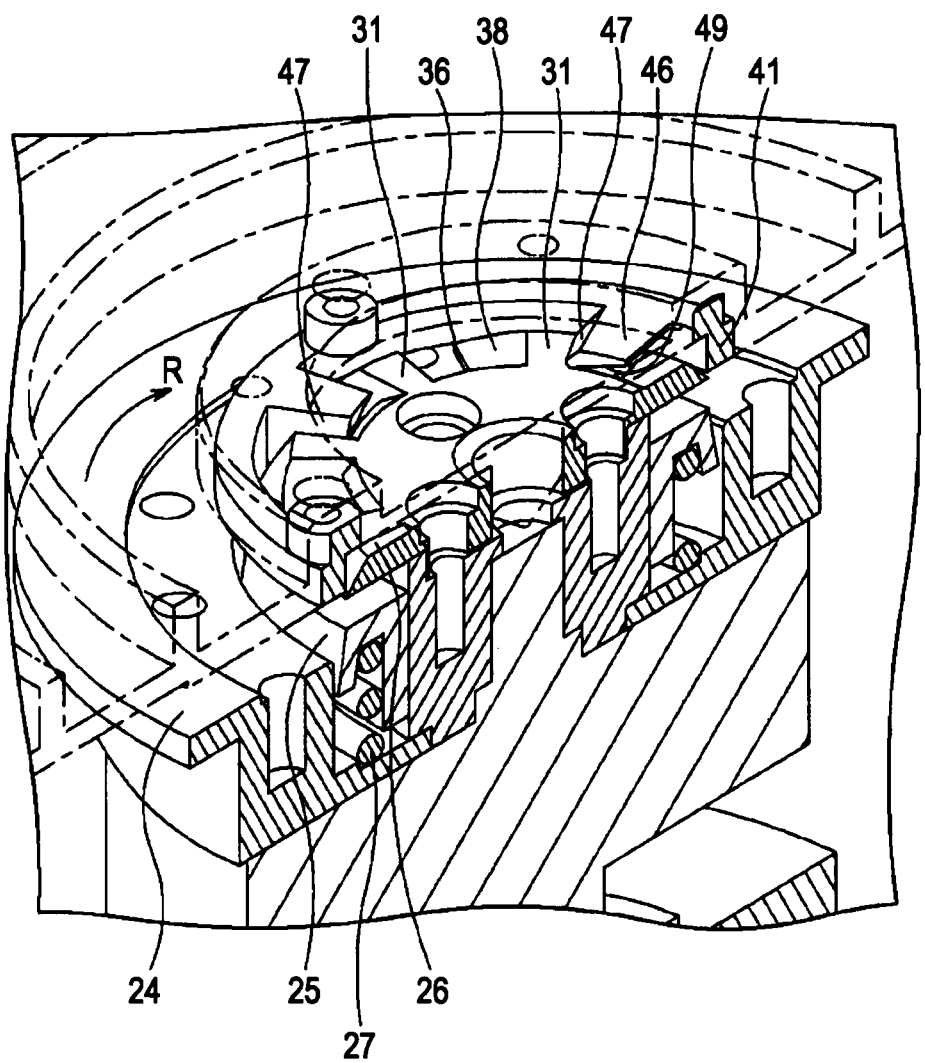
FIG. 8 is a sectional view showing a state where the engaging piece and the engaging protrusion are engaged with each other.

As shown in FIGS. 6 and 8, when the turntable 5 is rotated in the direction of the arrow R, the engaging surfaces 35 of the engaging pieces 31 hang over and contact the engaged surfaces 47 of the engaging protrusions 46. This allows a torque T in the direction of the arrow R associated with the rotation to act upon the chucking pulley 6 as a chucking force C of attaching by pressure to the turntable 5 via the engaging protrusions 46. The torque T in the direction of the arrow R associated with the rotation is increased as the rotation speed increases. Accordingly, even when the optical disc 3 is rotated at high speed, the engaging pieces 31 reliably sandwich the optical disc 3 by using the chucking force C that increases with the torque T produced by the high-speed rotation. Hence, the vibration of the optical disc 3 and the disengagement of the chucking pulley 6 can be prevented.

That is, when the rotation speed of the turntable 5 is higher, the force of attaching by pressure the engaging surfaces 35 to the engaged surfaces 47 of the engaging protrusions 46 increases, so that the chucking force C of the optical disc 3 by the turntable 5 and the chucking pulley 6 increases. Therefore, in the disc drive apparatus 1, even when a windage-loss torque due to air resistance on the optical disc 3 increases with the high-speed rotation, the optical disc 3 can be kept from slipping on the turntable 5.

Moreover, in the disc drive apparatus 1, as a result of the increase of the chucking force of the optical disc 3 by the turntable 5 and the chucking pulley 6, the vibration of the optical disc 3 can be prevented even when the windage-loss torque increases, and also the disengagement of the chucking pulley 6 from the turntable 5 can be prevented even when the vibration occurs on the disc outer periphery.

In the case of reducing the rotation speed of the optical disc 3 or stopping the turntable 5, a torque T' in the opposite direction of the arrow R, that is, in the opposite direction of the rotation direction of the optical disc 3, is produced on the engaging pieces 31 of the engaging yoke 26. Here, since the engaged surfaces 48 of the engaging protrusions 46 are locked by the engaging surfaces 36 of the engaging pieces 31, the chucking pulley 6 can be kept from moving in a direction of disengagement from the turntable 5.

Meanwhile, when ejecting the optical disc 3, the disc drive apparatus 1 separates the support member 22 supporting the spindle motor 20 and the top cover 7 supporting the chucking pulley 6 from each other by the lift mechanism after the rotation of the turntable 5 stops. By separating the turntable 5 and the chucking pulley 6 from each other in this way, the optical disc 3 is dechucked.

Here, since the disc drive apparatus 1 uses the magnet 43 having a same magnetic force as in related art, the dechucking can be performed smoothly without using excessive power in order to pull the turntable 5 and the chucking pulley 6 apart. Moreover, since the chucking pulley 6 is rotatably supported by the top cover 7, the engaging protrusions 46 which are engaged with the engaging pieces 31 can be easily removed from between the engaging pieces 31.

[Friction Sheet]

The friction sheet 42 for producing a friction torque between the chucking pulley 6 and the upper surface of the optical disc 3 is stuck to the chucking pulley 6. The friction sheet 42 is pressed on the optical disc 3, as a result of which the chucking pulley 6 is rotated integrally with the optical disc 3. In the case where friction between the optical disc 3 and the air in the apparatus body increases by the high-speed rotation of the optical disc 3 and a torque in the opposite direction of the arrow R due to air resistance, that is, a windage-loss torque, is produced, the engaging protrusions 46 of the engaging ring 41 in the chucking pulley 6 are biased to the engaging pieces 31 by this windage-loss torque.

Therefore, the chucking pulley 6 enables the windage-loss torque to act as the chucking force C to the turntable 5, in such a manner that the engaged surfaces 47 of the engaging protrusions 46 are pressed on the engaging surfaces 35 of the engaging pieces 31 by the windage-loss torque in the opposite direction of the arrow R. When the rotation speed of the optical disc 3 is higher, the windage-loss torque increases and accordingly the chucking force C increases. Hence, the optical disc 3 can be reliably chucked by the chucking pulley 6 and the disengagement of the chucking pulley 6 from the turntable 5 can be prevented, without increasing the magnetic force of the magnet 43 more than necessary.

Moreover, the chucking pulley 6 has the friction sheet 42 in contact with the upper surface of the optical disc 3. Accordingly, even when the upper surface of the optical disc 3 is at a negative pressure and the optical disc 3 is drawn upward, the friction with the friction sheet 42 increases, and so the optical disc 3 can be rotated at a predetermined rotation speed without slipping.

Figure 9:
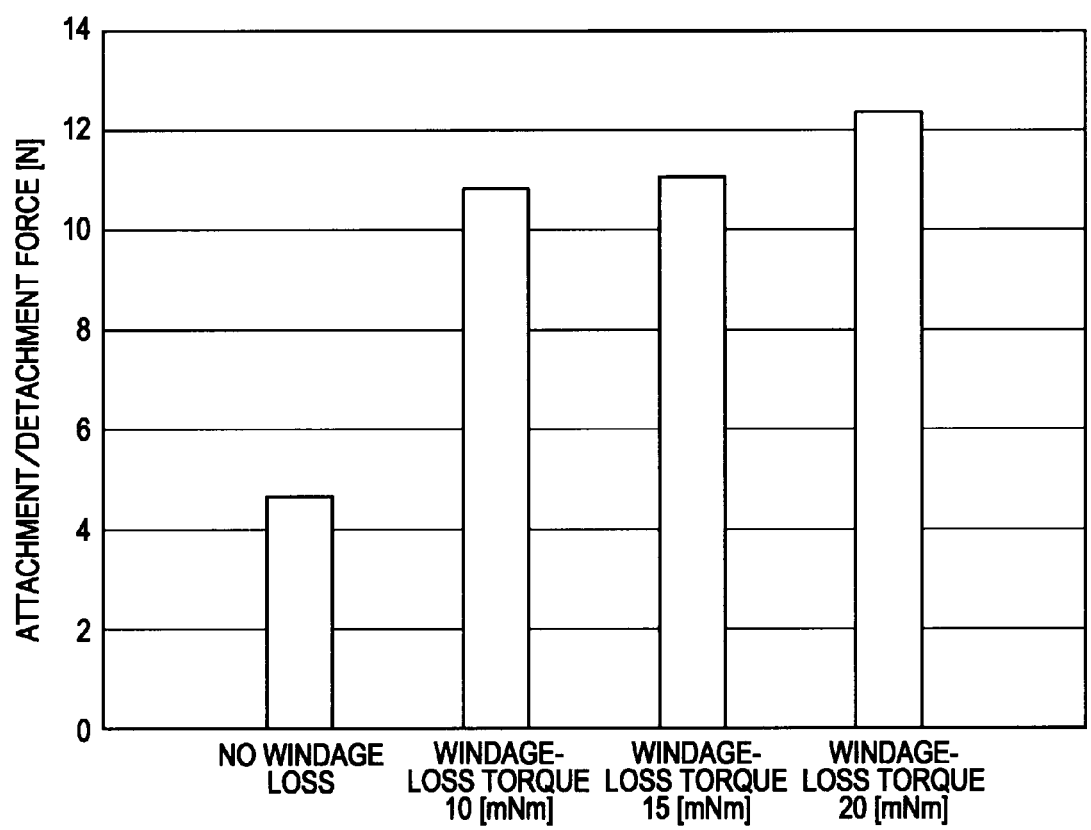
FIG. 9 is a graph showing an attachment/detachment force in a state where the disc drive apparatus rotates the disc and a state where the disc drive apparatus stops the rotation.

FIG. 9 shows a relationship between the windage-loss torque [mNm] of the optical disc 3 and the attachment/detachment force [N] for pulling the chucking pulley 6 apart from the turntable 5 in the disc drive apparatus 1. As shown in FIG. 9, in a state where the windage-loss torque is not produced, that is, in a state where the turntable 5 is not rotated, the attachment/detachment force of the chucking pulley 6 is a little less than 5 [N]. In a state where the turntable 5 is rotated and the windage-loss torque of 10 [mNm] is produced, the attachment/detachment force of the chucking pulley 6 increases to 11 [N]. This demonstrates that, by causing the windage-loss torque to act as the chucking force, the disc drive apparatus 1 can more than double the attachment/detachment force of the chucking pulley 6, as a result of which the optical disc 3 can be reliably chucked.

Furthermore, as the windage-loss torque increases to 15 [mNm] and to 20 [mNm], the attachment/detachment force of the chucking pulley 6 increases. That is, since the disc drive apparatus 1 uses the windage-loss torque as the attachment/detachment force of the chucking pulley 6, the attachment/detachment force of the chucking pulley 6 increases in proportion to the windage-loss torque. Therefore, in the disc drive apparatus 1, the attachment/detachment force is sufficient even when the optical disc 3 is rotated at high speed. The windage-loss torque of 20 [mNm] corresponds to a windage-loss torque produced when rotating an optical disc of 12 cm in diameter at 21000 rpm.

[Engaging Surface 35 and Engaged Surface 47]

Figure 5B:
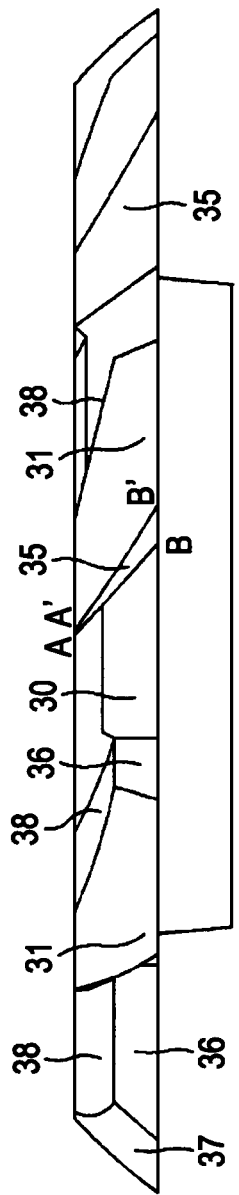
FIG. 5B is a side view showing the engaging yoke.

The engaging surface 35 and the engaged surface 47 are both formed as curved surfaces that are capable of surface contact with each other in any position in the contact/separation direction of the turntable 5 and the chucking pulley 6. That is, as shown in FIGS. 5A and 5B, the engaging surface 35 is a curved surface from an upper side A-A' that extends radially from the main surface 30a of the yoke body 30, to a lower side B-B' that extends radially from the lower surface of the yoke body 30 and deviates from the upper side A-A' in the circumference direction of the yoke body 30 toward the opposite direction of the arrow R. The engaging surface 35 is constituted by radial line segments passing through the center of the yoke body 30, in any position in the thickness direction of the yoke body 30. Likewise, the engaged surface 47 is a curved surface from an upper side that extends radially from the upper surface of the ring portion 45, to a lower side that extends radially from the lower surface of the ring portion 41 and deviates from the upper side in the circumference direction of the ring portion 45 toward the opposite direction of the arrow R. The engaged surface 47 is constituted by radial line segments passing through the center of the ring portion 41, in any position in the thickness direction of the ring portion 41.

By forming such curved surfaces, the engaging surface 35 and the engaged surface 47 can achieve surface contact even when there is a variation in engagement height, and as a result the torque associated with the high-speed rotation of the turntable 5 or the windage-loss torque of the optical disc 3 can be reliably transmitted to the engaging piece 31 and the engaging protrusion 46. Moreover, the torque is applied not locally but to the entire surfaces of the engaging piece 31 and the engaging protrusion 46. Accordingly, breakage and damage can be suppressed, and durability can be maintained.

In detail, the engaging piece 31 and the engaging protrusion 46 are brought into contact with each other while rotating the turntable 5 and the chucking pulley 6. In the case where the optical disc 3 has a design dimension and the turntable 5 and the chucking pulley 6 sandwich the optical disc 3 at a designed position in the thickness direction, the engaging piece 31 and the engaging protrusion 46 can achieve surface contact even when they are formed as flat surfaces. However, the optical disc 3 can be supplied from various manufacturers. In addition, the optical disc 3 can vary in thickness due to aging or an environment such as a temperature and a humidity, causing a variation in position of the turntable 5 and the chucking pulley 6 in the thickness direction when sandwiching the optical disc 3. In such a case, if the engaging surface 35 and the engaged surface 47 are formed as flat surfaces, a difference in height leads to a difference in contact angle, which makes surface contact difficult even though line contact is possible. In view of this, in the disc drive apparatus 1, by forming the engaging surface 35 and the engaged surface 47 as curved surfaces, surface contact can be achieved even when there is a variation in contact height.

[Other Remarks]

A friction member like the friction sheet 42 is not provided in the turntable 5. Therefore, in the turntable 5, the optical disc 3 is directly mounted on the flange 24 and supported by surface contact. In the case where a friction sheet that contacts the signal recording surface of the optical disc 3 is stuck to the turntable 5, it is difficult to stably support the optical disc 3 due to elasticity of the friction sheet, causing the optical disc 3 to vibrate with high-speed rotation. In view of this, by directly supporting the optical disc 3 without interposing a friction sheet, the vibration of the optical disc 3 can be effectively prevented even during high-speed rotation.

In the engaging yoke 26, an outer peripheral surface 37 of the engaging piece 31 may be formed as an inclined surface that is gradually enlarged in diameter in the direction toward the flange 24, as shown in FIGS. 4, 5A, and 5B. In this way, when inserting the engaging yoke 26 through the center hole 3a of the optical disc 3, the optical disc 3 can be centered by guiding the inner periphery of the center hole 3a by the outer peripheral surface 37 of the engaging piece 31.

In the engaging yoke 26, a flat surface 31a flush with the main surface 30a of the yoke body 30 may be formed from the upper side A-A' of the engaging surface 35 in the opposite direction of the arrow R, as shown in FIG. 5A. This contributes to a greater strength of the engaging piece 31 when compared with the case of forming an inclined surface from the upper side A-A' of the engaging surface 35 to the upper side of the locking surface 36, thereby preventing damage.

The engaging surface 35 of the engaging yoke 26 and the engaged surface 47 of the engaging ring 41 are not limited to tapered surfaces, and may be formed as surfaces horizontal to each other where the engaging surface 35 hangs over the engaged surface 47.

The turntable 5 may be formed so that, instead of forming the engaging yoke 26 using a magnetic material, another magnetic member that is attracted to the magnet 43 is disposed on the turntable 5 and the engaging pieces 31 are formed integrally with the turntable 5. Likewise, the chucking pulley 6 may be formed so that, instead of attaching the engaging ring 41, the engaging protrusions 46 are formed integrally with the chucking pulley 6.

The embodiments of the present invention is applicable not only to the disc drive apparatus 1 that conveys and rotates the optical disc 3, but also to a drive apparatus compatible with a disc cartridge in which a disc storage medium is enclosed in a cartridge.

The present application contains subject matter related to that disclosed in Japanese Priority Patent Application JP 2009-074325 filed in the Japan Patent Office on Mar. 25, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A disc loading mechanism comprising:
   a turntable on which a disc is mounted, the turntable including a table engaging member being disk shaped and having a plurality of engaging pieces formed thereon; and
   a chucking pulley that sandwiches the disc together with the turntable, the chucking pulley including a pulley engaging member having a plurality of engaging protrusions formed thereon,
   wherein the plurality of engaging pieces are distributed annularly around the table engaging member on a same plane,
   wherein each of the plurality of engaging pieces has an engaging surface that hangs over a chucking pulley-facing surface of a corresponding one of the plurality of engaging protrusions in a rotation direction of the disc, and
   wherein prior to a chucking operation, the turntable and the chucking pulley are not in contact with each other.

2. The disc loading mechanism according to claim 1, wherein when the turntable is rotated, the engaging surface of each engaging piece contacts the corresponding engaging protrusion.

3. The disc loading mechanism according to claim 2, wherein the engaging surface of each engaging piece is a tapered surface that is inclined relative to a contact/separation direction of the chucking pulley and the turntable, and
   wherein an engaged surface of each engaging protrusion in contact with the corresponding engaging surface is a tapered surface that is inclined relative to the contact/separation direction of the chucking pulley and the turntable.

4. The disc loading mechanism according to claim 3, wherein the respective engaging surfaces and the engaged surfaces are curved surfaces that are capable of surface contact with each other in any position in the contact/separation direction of the chucking pulley and the turntable.

5. The disc loading mechanism according to claim 3, wherein each of the plurality of engaging pieces further has a flat surface flush with a main surface of the table engaging member, and
   wherein the flat surface faces the chucking pulley.

6. The disc loading mechanism according to claim 1, wherein each of the plurality of engaging pieces has a locking surface that hangs over the respective chucking pulley-facing surface of one of the plurality of engaging protrusions in a direction opposite to the rotation direction of the disc.

7. The disc loading mechanism according to claim 6, wherein the locking surface of the plurality of engaging pieces locks a locked surface formed on the plurality of engaging protrusions when a rotational speed of the turntable is reduced.

8. The disc loading mechanism according to claim 1, further comprising a friction member disposed on the chucking pulley that produces a friction torque between the chucking pulley and the disc.

9. The disc loading mechanism according to claim 8, wherein the friction member adheres to a surface of a body of the chucking pulley, which faces the disc.

10. The disc loading mechanism according to claim 1, wherein the pulley engaging member is integrally formed in the chucking pulley.

11. The disc loading mechanism according to claim 1, wherein the table engaging member is integrally formed in the turntable.

12. The disc loading mechanism according to claim 1, wherein the turntable accommodates directly supporting the disc without interposition of a friction member.

13. The disc loading mechanism according to claim 1, wherein each engaging piece further includes a locking surface disposed on a side opposite the engaging surface that locks with a corresponding engaging protrusion.

14. The disc loading mechanism according to claim 1, wherein the chucking pulley sandwiches the disc together with the turntable by a chucking force that increases with a torque produced by a high-speed rotation of the disc.

15. The disc loading mechanism according to claim 1, wherein the table engaging member includes a magnetic material therein,
   wherein the chucking pulley includes a magnet, and
   wherein the table engaging member is magnetically attracted to the magnet of the chucking pulley.

16. The disc loading mechanism according to claim 1, wherein the table engaging member is magnetically attracted to the chucking pulley.

17. The disc loading mechanism according to claim 1, wherein, during a dechucking operation, the turntable and the chucking pulley are separated from each other.

18. The disc loading mechanism according to claim 1, wherein, after a dechucking operation, the turntable and the chucking pulley are not in contact with each other.

19. The disc loading mechanism according to claim 1, wherein during the chucking operation, the engaging surface and the engaging protrusions of the chucking pulley are inserted between the engaging pieces of the table engaging member, causing the engaging surface to contact the engaging protrusions.

20. A disc drive apparatus comprising:
   a turntable on which a disc is mounted, the turntable including a table engaging member being disk shaped and having a plurality of engaging pieces formed thereon;
   a disc rotation mechanism that rotates the turntable;
   an optical pickup mechanism that performs at least one of recording and playback of an information signal on the disc rotated by the disc rotation mechanism;
   a conveyance mechanism that conveys the disc; and
   a chucking pulley that rotatably sandwiches the disc together with the turntable, the chucking pulley including a pulley engaging member having a plurality of engaging protrusions formed thereon,
   wherein the plurality of engaging pieces are distributed annularly around the table engaging member on a same plane,
   wherein each of the plurality of engaging pieces has an engaging surface that hangs over a chucking pulley-facing surface of a corresponding one of the plurality of engaging protrusions in a rotation direction of the disc, and
   wherein prior to a chucking operation, the turntable and the chucking pulley are not in contact with each other.

21. The disc drive apparatus according to claim 20, wherein during the chucking operation, the engaging surface and the engaging protrusions of the chucking pulley are inserted between the engaging pieces of the table engaging member, causing the engaging surface to contact the engaging protrusions.

22. An apparatus comprising:
   a turntable including a table engaging member being disk shaped and having a plurality of engaging pieces formed thereon; and a chucking pulley including a pulley engaging member having a plurality of engaging protrusions formed thereon, wherein the plurality of engaging pieces are distributed annularly around the table engaging member on a same plane, wherein each of the plurality of engaging pieces has an engaging surface that hangs over a chucking pulley-facing surface of a corresponding one of the plurality of engaging protrusions in a rotation direction of the turntable, and wherein prior to a chucking operation, the turntable and the chucking pulley are not in contact with each other.

23. The apparatus according to claim 22, wherein during the chucking operation, the engaging surface and the engaging protrusions of the chucking pulley are inserted between the engaging pieces of the table engaging member, causing the engaging surface to contact the engaging protrusions.

* * * * *